(12) United States Patent
Sevo et al.

(10) Patent No.: US 11,411,645 B2
(45) Date of Patent: Aug. 9, 2022

(54) SIGNAL SWITCH AND METHOD OF OPERATING A SIGNAL SWITCH

(71) Applicant: SIGNIFY HOLDING B.V., Eindhoven (NL)

(72) Inventors: Aleksandar Sevo, Eindhoven (NL); Johan Paul Marie Gerard Linnartz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/335,333

(22) Filed: Jun. 1, 2021

(65) Prior Publication Data
US 2021/0376927 A1    Dec. 2, 2021

(30) Foreign Application Priority Data
Jun. 2, 2020   (EP) .................................. 20177820

(51) Int. Cl.
*H04B 10/11* (2013.01)
*H04B 10/69* (2013.01)
*H04B 10/079* (2013.01)
*H04Q 11/00* (2006.01)

(52) U.S. Cl.
CPC ... *H04B 10/07953* (2013.01); *H04Q 11/0005* (2013.01)

(58) Field of Classification Search
CPC .............................. H04B 10/11; H04B 10/69
See application file for complete search history.

(56) References Cited

U.S. PATENT DOCUMENTS

| | | | |
|---|---|---|---|
| 6,983,110 B2 * | 1/2006 | Buckman | H04B 10/69 398/153 |
| 2003/0063354 A1 | 4/2003 | Davidson | |
| 2017/0373761 A1 | 12/2017 | Parker et al. | |
| 2020/0153506 A1 * | 5/2020 | Linnartz | H05B 47/195 |

FOREIGN PATENT DOCUMENTS

WO       2019016024 A1      1/2019

* cited by examiner

*Primary Examiner* — Shi K Li

(57) ABSTRACT

A signal switch comprises a switch arrangement for selectively passing optical wireless communication, OWC, signals received from a plurality of photodetectors for output to an external device. A signal strength detector is arranged to measure a signal strength of OWC signals as passed by the switch arrangement. While an OWC signal received from a first one of the photodetectors with a signal strength is being passed by the switch arrangement, a selection unit controls the switch arrangement to pass a combination of the OWC signal from the first photodetector and the OWC signal from another photodetector, determines a signal strength of the combination of OWC signals, and estimates the signal strength of the OWC signal from the other photodetector based on the signal strength of the OWC signal from the first photodetector and the signal strength of the combination of OWC signals.

15 Claims, 10 Drawing Sheets

SIGNAL SWITCH AND METHOD OF OPERATING A SIGNAL SWITCH

CROSS-REFERENCE TO RELATED APPLICATIONS

This patent application claims the priority benefit of European Application No. 20177820.6 filed Jun. 2, 2020, the contents of which are herein incorporated by reference.

TECHNICAL FIELD

The present disclosure relates to a signal switch and method of operating a signal switch.

BACKGROUND

Light Fidelity (LiFi) refers to techniques whereby information is communicated in the form of a signal embedded in light (including for example visible light, or infrared light) emitted by a light source. Depending for example on the particular wavelengths used, such techniques may also be referred to as coded light, optical wireless communications (OWC), visible light communication (VLC) or free-space optical communication (FSO). These terms are often used interchangeably. In this context: visible light may be light that has a wavelength in the range 380 nm to 740 nm; and infrared light may be light that has a wavelength in the range 740 nm to 1.5 mm. It is appreciated that there may be some overlap between these ranges.

LiFi/OWC/VLC/FSO signals can be received using photodetectors which generate an electrical signal in response to incident light. A "segmented" LiFi receiver is a device which comprises a plurality of "segments", each segment having a photodetector, or multiple photodetectors, for receiving LiFi signals from a transmit device. A signal switch is typically implemented between the plurality of segments and an external device (e.g. a decoder) in order to control which segment is used.

FIG. 1 shows schematically a known type of signal switch 10 for selectively passing signals to an external device.

The signal switch 10 receives input from a plurality of segments. In this example, each segment comprises a photodetector 11, a transimpedance amplifier (TIA) 12, a first stage amplifier 13, and a second stage amplifier 14. Within each segment, the photodetector 11 generates an electrical current in response to light incident on the photodetector 11. This electrical current is converted to an electrical voltage signal by the respective TIA 12 and then amplified, first by the first stage amplifier 13 and then by the second stage amplifier 14.

In this example, there are three segments. Each segment is connected to a different input of a switch arrangement 15. A selection unit 17 is provided for controlling the switch arrangement 15 to selectively pass the signal from one of the segments to an output 18 which may be connected to an external device (e.g. a modem).

The photodetector 11 of each segment receives light from a different respective field of view or sector, potentially having some overlap. This means that a same signal received from the transmit device may be received with a higher signal strength via one segment than the other segments.

The selection unit 17 is connected to a plurality of signal strength detectors 16. Each signal strength detector 16 is arranged to detect a signal strength of the signal generated by a respective segment (hence, in this example, there are three signal strength detectors 16a-c).

In operation, the selection unit 17 determines, using the signal strength detectors 16, which segment currently has the highest signal strength and controls the switch arrangement 15 to use that segment. This ensures that the optimal signal is passed to the external device for the purposes of data extraction.

SUMMARY

According to a first aspect disclosed herein, there is provided a signal switch comprising: a switch arrangement for selectively passing OWC signals received from a plurality of photodetectors for output on an output of the signal switch; a signal strength detector arranged to measure a signal strength of OWC signals as passed by the switch arrangement; and a selection unit for controlling the switch arrangement; wherein the selection unit is configured to estimate, while an OWC signal received from a first one of the photodetectors with a signal strength is being passed by the switch arrangement to said output of the signal switch, a signal strength of an OWC signal received from another one of the photodetectors, by performing an evaluation process in which the selection unit is configured to: control the switch arrangement to pass a combination of the OWC signal from the first photodetector and the OWC signal from the other photodetector; determine, using the signal strength detector, a signal strength of said combination of OWC signals; and estimate the signal strength of the OWC signal from the other photodetector based on the signal strength of the OWC signal from the first photodetector and the signal strength of said combination of OWC signals.

In an example, the selection unit is configured to cause a gain G to be applied to the OWC signal from the other photodetector to reduce the signal strength of the OWC signal from the other photodetector before the OWC signal from the other photodetector is passed to the switch arrangement. An advantage of this is that the added signal (from the other photodetector) will interfere less with the signal from the first photodetector which is currently being used. In some examples, the selection unit is configured to cause the gain G to be applied by controlling a respective attenuator of the other segment.

In an example, the selection unit is configured to determine to switch from passing OWC signals received via the first photodetector to passing OWC signals received via the other photodetector if the estimated signal strength of the OWC signal from the other photodetector exceeds the signal strength of the OWC signal from the first photodetector by more than a selection threshold.

In an example, the selection unit is configured to enact the switch from the first photodetector to the other photodetector by gradually reducing a gain applied to the signal from the first photodetector while gradually increasing a gain applied to the signal from the second photodetector. In other words, the switch may be enacted in a "smooth" manner.

The selection threshold may be zero or may be greater than zero to avoid frequent switching. The selection threshold may be equal to the signal strength of the current (first) photodetector.

In an example, the selection unit is configured to determine to pass both OWC signals received via the first and other photodetector if the estimated signal strength of the OWC signal from the other photodetector is equal to the signal strength of the OWC signal from the first photodetector to within a threshold amount. In this manner the selection unit may improve the received signal strength when an incoming signal is in an overlapping region of the coverage areas of both photodetectors.

In an example, selection unit is configured to estimate a signal strength for OWC signals received via more than one other photodetector before determining to switch from passing OWC signals received via the first photodetector to passing OWC signals received via the photodetector having the highest estimated signal strength.

In an example, the selection unit is configured to estimate a signal strength for OWC signals received via all of the photodetectors other than the first photodetector before determining to switch to passing OWC signals received from the first photodetector to passing OWC signals received via the photodetector having the highest estimated signal strength.

In an example, the selection unit is configured to estimate the signal strength of the OWC signal from the other photodetector as the signal strength of the combination minus the signal strength of the OWC signal from the first photodetector. The rationale being that the last measurement of the first photodetector signal prior to the combination is sufficient to obtain a good measure of the signal contribution of the other photodetector.

In an example, the selection unit is configured to estimate signal strengths for OWC signals received via the other photodetectors in a sequence based on respective fields of view for each photodetector. Advantageously photodetectors with a coverage area, partially overlapping and/or adjacent to the field of view of the currently used photodetector are evaluated first, the rational being that when the communication partner moves; it likely is to an overlapping and/or adjacent field of view.

In an example, the selection unit is configured to determine an OWC signal received via one of the photodetectors as having the highest signal strength by performing a binary search of the photodetectors.

In an example, the selection unit is configured to estimate signal strengths for the other photodetectors in a sequence based on historical patterns.

In an example, the selection unit is configured to perform the evaluation process according to a predetermined schedule.

In an example, the selection unit is configured to perform the evaluation process in response to the signal strength of the first OWC signal falling below a trigger threshold signal strength. In this manner the trigger threshold signal strength is used to trigger the evaluation.

In an example, the selection unit is configured to perform the evaluation process in response to the rate of fall of the signal strength of the first OWC signal being greater than a threshold rate.

According to a second aspect disclosed herein, there is provided a modem comprising the signal switch according to the first aspect, the modem being configured to process the OWC signal output by the signal switch.

According to a third aspect disclosed herein, there is provided a system comprising the signal switch according to the first aspect and the plurality of photodetectors.

According to a fourth aspect disclosed herein, there is provided a method performed by a signal switch comprising a switch arrangement for selectively passing OWC signals received via a plurality of photodetectors for output on an output of the signal switch, the method comprising: estimating, while a first OWC signal received from a first photodetector with a signal strength is being passed by the switch arrangement to said output of the signal switch, a signal strength of a second OWC signal received from a second photodetector by performing an evaluation process comprising: controlling the switch arrangement to pass a combination of the first OWC signal and the second OWC signal; determining a signal strength of said combination of OWC signals; and estimating the signal strength of the second OWC signal based on the signal strength of the first OWC signal and the signal strength of said combination of OWC signals.

In an example, the method comprises determining to switch from passing OWC signals received via the first photodetector to passing OWC signals received via the other photodetector if the estimated signal strength of the OWC signal from the other photodetector exceeds the signal strength of the OWC signal from the first photodetector by more than a selection threshold.

Also described herein is a signal switch comprising: a first switch arrangement for selectively passing OWC signals received from a plurality of photodetectors for output to an external device; a second switch arrangement for selectively passing OWC signals received from the plurality of photodetectors; a signal strength detector arranged to measure a signal strength of OWC signals as passed by the second switch arrangement; a selection unit for controlling the first and second switch arrangements; wherein the selection unit is configured to determine, while an OWC signal received from a first one of the photodetectors with a signal strength is being passed by the first switch arrangement to said external device, a signal strength of an OWC signal received from another one of the photodetectors, by performing an evaluation process in which the selection unit is configured to: control the second switch arrangement to pass an OWC signal from another photodetector other than the first photodetector;

determine, using the signal strength detector, a signal strength of the OWC signal from the other photodetector.

In an example, the signal strength detector comprises a correlator.

In an example, the signal switch comprises a low-pass filter arrangement for removing high frequencies from the OWC signals prior to the signal strength detector. The low-pass filter may, for example, pass frequency of 10 MHz of lower.

In an example, the signal switch comprises a high-pass filter arrangement for removing low frequencies from the OWC signals prior to the signal strength detector. The high-pass filter may, for example, pass frequencies of 1 MHz or higher.

In an example, the high-pass filter arrangement and low-pass filter arrangement may be realised using a band-pass filter arrangement.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
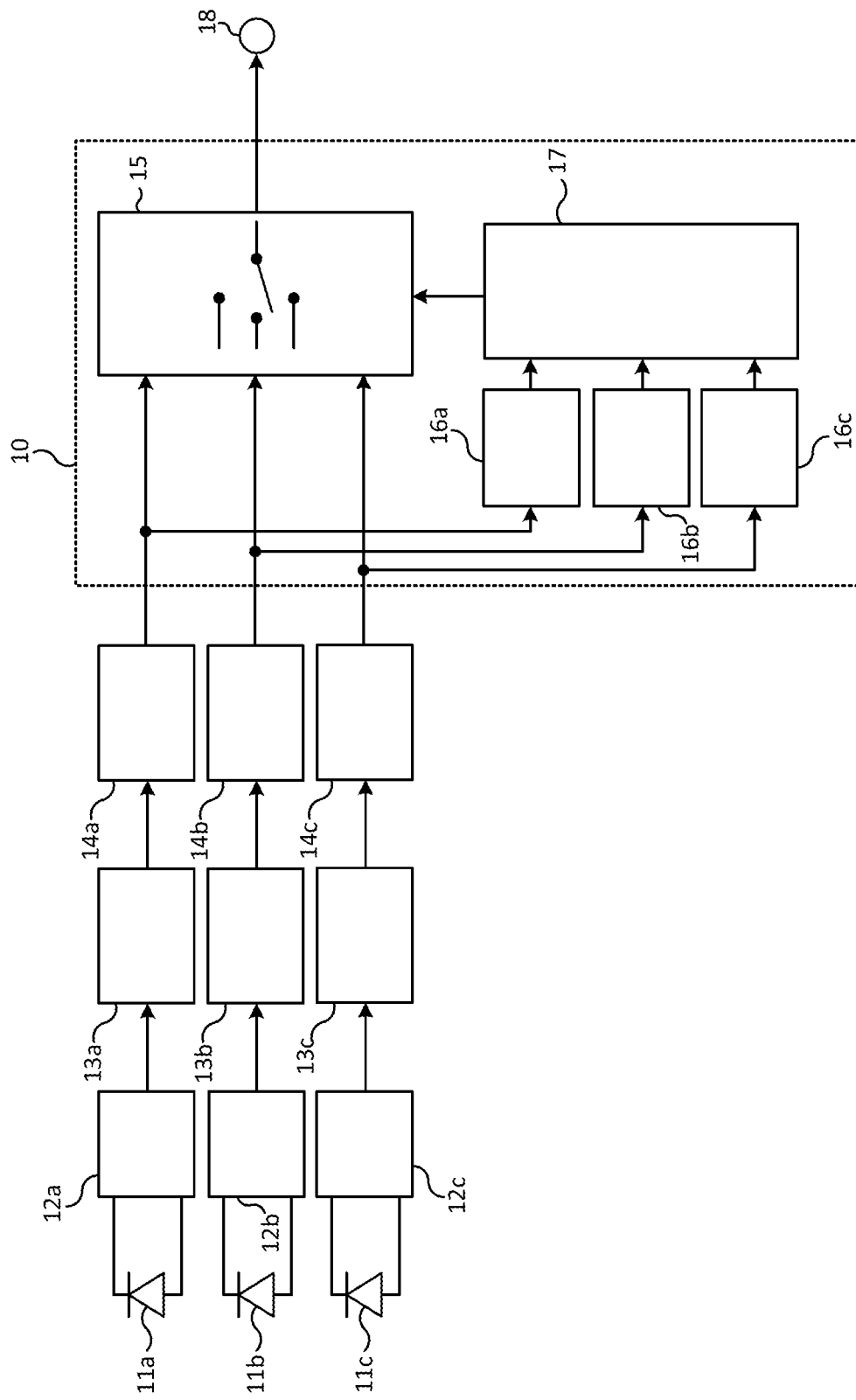
FIG. 1 shows schematically a known type of signal switch.

The present disclosure relates to a signal switch for selectively passing OWC signals. In use, the signal switch is connected to a plurality of photodetectors for receiving OWC signals as modulated light via one or more of the photodetectors. The OWC signals comprise a stream of encoded data.

The terms "OWC" and therefore also "OWC signal" and similar are used herein to refer generally to modulated light signals receivable using one or more photodetectors. Hence, these may in some instances be referred to as LiFi, VLC, FSO, etc. In particular, it is appreciated that while the term "LiFi" may be used herein, it is not limited to the use of visible wavelengths of light.

In examples in use, the photodetectors are arranged in segments in a LiFi receiver. The photodetector of each segment receives light from a different respective field of view or "sector", potentially with some overlap. This means that a same signal received from a transmit device may be received with a higher signal strength via one segment than the other segments. Information relating to the location of the transmit device can be inferred from the relative signals strengths of signals received from each the photodetectors.

The signal switch may pass the signal from any of the photodetectors (i.e. from any segment) on an output of the signal switch, for example to an external device (e.g. a modem or a decoder) for further processing. However, it may be easier for the external device to process a signal with a higher signal strength. Therefore, it can be advantageous to identify which photodetector is currently receiving with the highest signal strength and to select the segment having that photodetector as the one to use.

Even in cases where the signal switch passes signals from more than one photodetector (i.e. uses more than one of the segments) simultaneously, it can still be advantageous to determine which photodetector, and therefore which segment, has the highest signal strength. This is because, for example, information regarding which segment has the highest signal strength may be used to estimate a location of the transmit device, meaning that signals to be sent to the transmit device can be directed towards the estimated location and do not need to be directed more generally or even omnidirectionally, thereby reducing the power requirement on the transmit side.

Examples described herein provide signal switch arrangements which require only a single signal strength detector in order to determine which photodetector has the highest signal strength. This provides improvements of space for and cost of components compared to prior art signal switches which require a signal strength detector per photodetector (i.e. the same number as there are segments) as shown schematically in FIG. 1 such that the present signal switch can be made smaller and more cheaply.

Moreover, the signal switch is able to determine whether or not to switch from a currently-selected segment to another segment before actually switching between segments. That is, the determination can be made in a "make-before-break" manner, that is without interrupting the signal from the currently-selected segment (without interruption of the receiving stream), which would be highly undesirable as it may result in lost data.

In other words, in examples a circuit is provided for sequential evaluation of inputs from a segmented optical front-end, whereby the evaluation involves a solution that utilizes a single signal strength detector to evaluate a sequential basis the addition of a further signal component from a further input segment.

Figure 2:
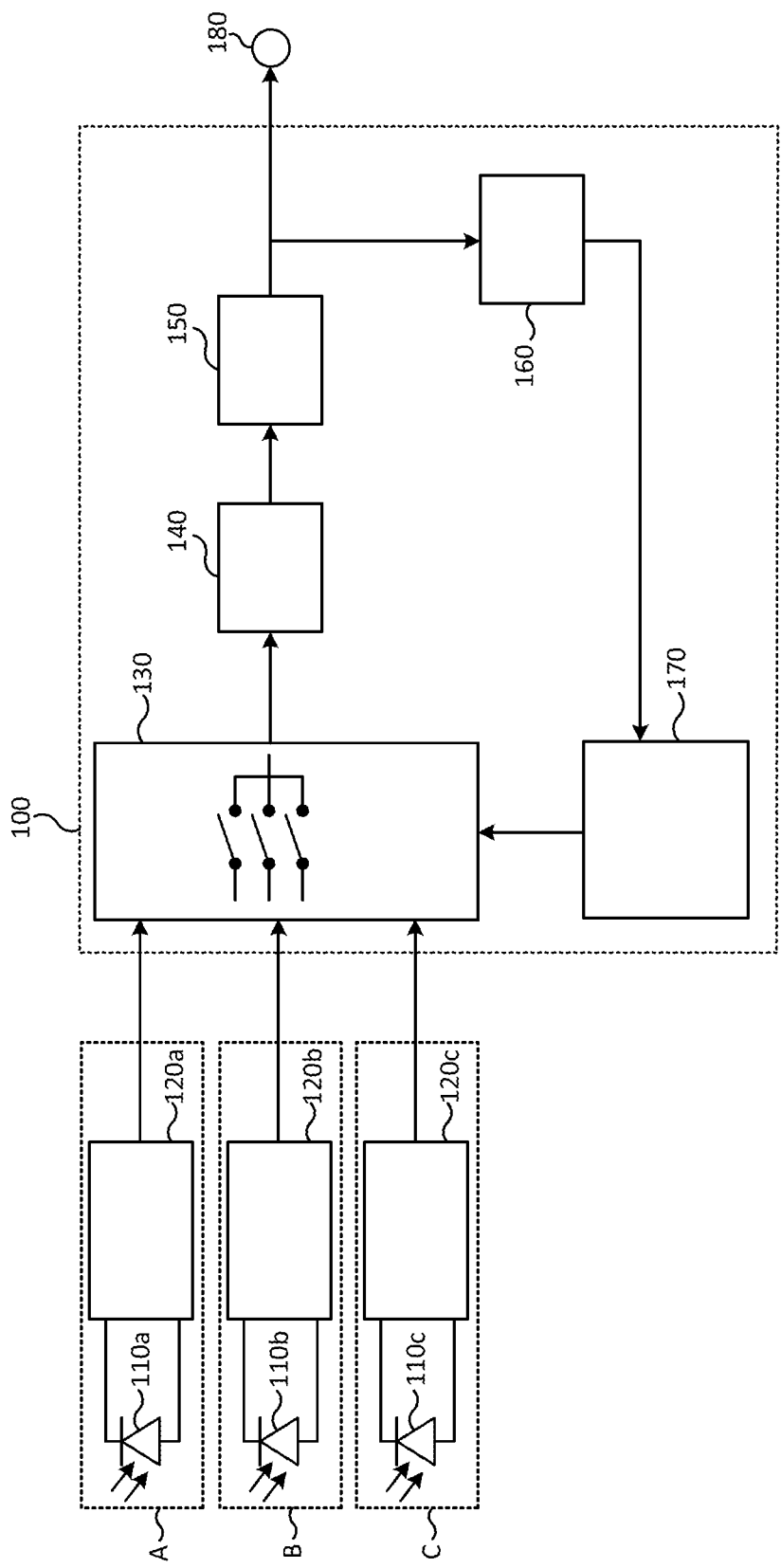
FIG. 2 shows schematically an example of a signal switch 100 in accordance with the present disclosure.

FIG. 2 shows schematically an example of a signal switch 100 in accordance with the present disclosure. FIG. 2 shows the signal switch 100 as implemented in a segmented LiFi receiver having a plurality of segments for receiving LiFi signals.

Each segment comprises a photodetector 110 for receiving LiFi signals. In this example, there are three segments A-C but it is appreciated that there may be, in other examples, two segments, four segments, or five or more segments.

The photodetector 110 of each segment generates an electrical current in response to light incident on that photodetector 110. Specifically, each photodetector 110 generates an electrical signal in response to a LiFi signal in the form of modulated light. Examples of suitable photodetectors include photodiodes, avalanche photodiodes, etc. In operation, the signal generated by each photodetector 110 may be amplified, by a respective transimpedance amplifier (TIA) 120 as shown in FIG. 2, before being output from the segment. Other types of photodetector are possible, and some may not require a TIA or similar amplifier. In some examples, an LED or even a solar panel may be used as a photodetector.

In this example, the signal switch 100 comprises a switch arrangement 130, a first stage amplifier 140, a second stage amplifier 150, a signal strength detector 160, and a selection unit 170. The switch arrangement 130 of this example has one output and a plurality of inputs. The first stage amplifier 140 is operatively coupled to the output of the switch arrangement 130 to receive a signal passed by the signal switch 100. The second stage amplifier 150 is operatively coupled to the first stage amplifier 140 to receive an amplified signal from the first stage amplifier 140. Signals output by the second stage amplifier 150 are passed to an output 180 of the signal switch 100. The output 180 is connectable to an external device, e.g. a modem.

The first stage amplifier 140 and second stage amplifier 150 are internal amplifiers of the signal switch 100 which act to amplify signals passed by the switch arrangement 130 before being passed to the output 180. It is appreciated that in other examples there may be a different number of amplifiers, including for example a single amplifier, or no internal amplifiers at all, i.e. signals may be passed directly out of the signal switch 100 and amplified later by one or more external amplifiers (not shown). The amplifiers 140, 150 amplify the signals to the levels necessary for the decoder and signal strength detector. In practice, to obtain enough gain and sufficient bandwidth, multiple stages amplifier may be required. Each stage may provide a limited gain. Automatic Gain Control (AGC) may be applied, e.g. as the first stage of the detector after the input signals are combined, so as not to distort the relative contributions to the combined signal.

Whether the or each amplifier is internal to the signal switch 100 or external, only a single instance of the amplifiers (e.g. a single first stage amplifier and a single second stage amplifier) is required. This can reduce the cost, size, and manufacturing complexity compared with prior art signal switches (e.g. as shown in FIG. 1) which require separate amplifiers for each segment.

In this example, the signal strength detector 160 is operatively coupled to the output of the second stage amplifier 150 to receive signals output by the second stage amplifier 150. The selection unit 170 is operatively coupled to the switch arrangement 130 and to the signal strength detector 160 to receive outputs from the signal strength detector 160 and to control the switch arrangement 130.

Each input of the switch arrangement 130 is arranged to receive LiFi signals from a different respective one of the segments (in this example, from the respective TIA 120 of that segment).

The switch arrangement 130 is a "select-many" switch arrangement which can connect multiple inputs to the output simultaneously. The operation of the switching arrangement 130 is controlled by the selection unit 170.

The signal strength detector 160 is arranged to measure a signal strength of a signal passed by the switch arrangement 130. As mentioned above, the signal passed by the switch arrangement 130 may be amplified by one or more internal amplifiers before being passed to the signal strength detector 160 (as is in the case in the example shown in FIG. 2).

When more than one input signal is passed and output by the switch arrangement 130, the signals are combined such that the signal strength at the output is that of the combined signal. This "combined signal strength" may be, for example, equal to the sum of the signal strengths of the individual input signals. Further examples are given later below. In some examples, various levels of attenuation may be applied to the one or more signals passed by the switch arrangement 130 which can affect the composition of the combined signal strength.

This means that the signal strength detector 160 measures the signal strength of a (potentially amplified) single signal currently being passed by the switch arrangement 130 or of whatever combination of two or more signals is currently being passed by the switch arrangement 130 (potentially with gain adjustment or attenuation on one or more of the component signals). The signal strength detector 160 may be, for example, a root mean square (RMS) detector. Another example of a signal strength detector 160 is a peak detector, though it is appreciated that for OFDM, peaks values are a less well conditioned statistical variable. Another example of a signal strength detector 160 is an AC component average detector.

Another example of a suitable signal strength detector 160 is a full or half wave rectifier circuit, followed by a low pass filter or by an averaging device. It is well-known from mathematics that the average of the absolute value of a many commonly used modulation signals equals a constant times (is proportional to) the RMS value. For a Gaussian signal (such as an OFDM signal) this constant equals $(2/\pi)^2$. Thus, the output of a halve wave rectifier must be multiplied (by approximately 2.5) to get the RMS value of an OFDM signal. For a sinusoidal signal or a pulse amplitude modulation (PAM) signal, a similar, but different constant can be used. This constant can be pre-determined based on the known relation between mean signal and its variance. For example, for a sinusoid, the average of the absolute value is $2/\pi$ and the RMS is $(\sqrt{2})/2$.

Some RMS detector circuits, which may be used as the signal strength detector 160, output the logarithm of the RMS value. As examples described herein make decisions on ratios of power, in particular searches for an increase by $(1+G^2)$ or $(1+G)^2$ where G is 1 or between 0 and 1, a fixed changed difference in the logarithm of detector can be used.

Moreover, in the logarithmic domain, fixed conversion constants between mean, peak or averaged signal strengths become irrelevant and vanish when comparing logarithms of signal strengths. In these cases, the switching criterion can be based on a threshold of "log $(1+G^2)$" or "2 log $(1+G)$". The threshold may, in some examples, be a fixed system parameter.

The selection unit 170 is configured to control the switch arrangement 130 to selectively pass signals from one photodetector 110 or plural photodetectors 110 (i.e. from one or more segments).

In operation, the selection unit 170 is configured to use the signal strength as measured by the signal strength detector 160 to implement an evaluation process to determine whether to a) continue using a current segment, or b) switch to using a different segment instead.

The LiFi signal received using the current segment comprises a stream of data to be output from the signal switch 100 for use by an external device. Examples described herein allow the signal switch 100 to perform the evaluation process to determine whether or not to switch from the current segment before the actual switching takes place (if required), i.e. without interrupting the data stream in a make-before-break manner. This is advantageous as it helps to avoid losing parts of the data stream during the evaluation stage or when actually switching between segments.

Figure 3:
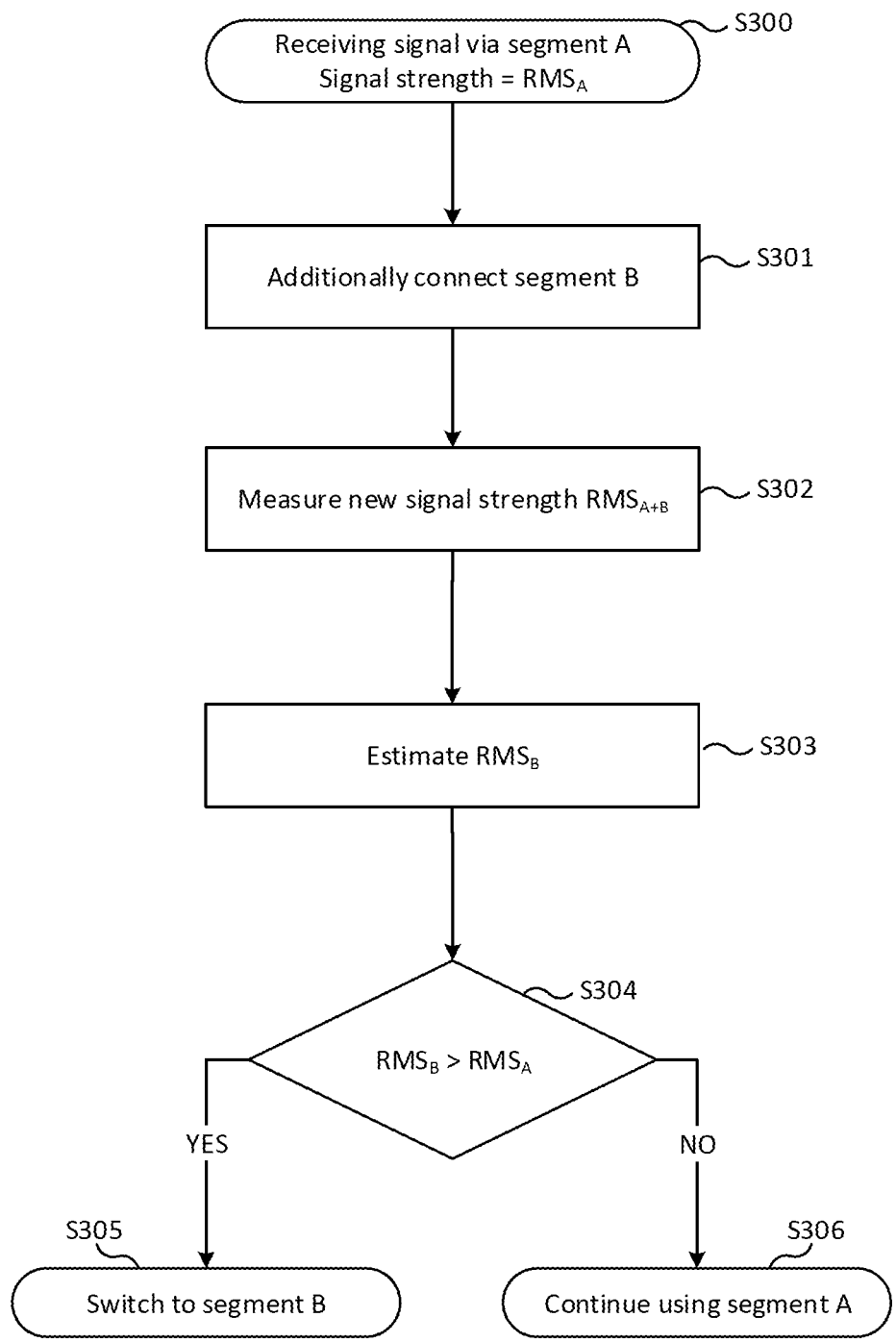
FIG. 3 flowchart illustrating an example of such an evaluation process performed by the selection unit.

FIG. 3 is a flowchart illustrating an example of such an evaluation process performed by the selection unit 170. The evaluation will be described in the context of determining whether or not to switch from using segment A to segment B, but it is appreciated that a similar process may be applied to determine whether to switch from any segment to any other segment.

At S300, a data stream (in the form of a LiFi signal) is being received using segment A, i.e. the switch arrangement 130 is passing only the signal as output by photodetector 110a to the output. This means that the signal from segment A is the one currently selected and output from the signal switch 100. It also means that the signal strength as measured by the signal strength detector is that of the signal as received by photodetector 110a in segment A. This signal strength will be denoted as $RMS_A$. The selection unit 170 may temporarily store the value of $RMS_A$ to a memory for use later, as described below.

At S301, the evaluation process begins by the selection unit 170 controlling the switch arrangement 130 to additionally connect segment B to the output. That is, the switch arrangement 130 is controlled to pass signals from both segment A and segment B simultaneously. As mentioned above, the signal from segment B may be reduced to a lower power level before being added. This can be done by attenuating the signal or otherwise reducing the gain applied by, e.g. the TIA of that segment. this is described in more detail later below.

At S304, the selection unit 170 determines the new signal strength for the combined signal using the signal strength detector 160. Because signals from both segment A and segment B are being passed by the switch arrangement 130, the signal strength measured by the signal strength detector 160 will be the signal strength of the combined signal (a combination of the signals from photodetector 110a and photodetector 110b). This signal strength will be denoted as $RMS_{A+B}$.

The effect of adding in the signal from photodetector 110b is reflected in the change to the signal strength measured by the signal strength detector 160. Specifically, the signal strength will increase when segment B is added, and the magnitude of the increase is indicative of the signal strength of segment B itself.

At S303, the selection unit 170 estimates the signal strength of segment B, $RMS_B$, based on the change in signal strength resulting from the addition of segment B ($RMS_{A+B}-RMS_A$). This is very advantageous as it allows (an estimate of) the signal strength of segment B to be determined without directly measuring it, which would otherwise require either temporarily disconnecting segment A (and losing part of the data stream) or using a second signal strength detector to independently measure $RMS_B$.

Knowing the estimated signal strength of segment B is valuable in and of itself. As mentioned above, information regarding the signal strengths of the segments may be used to estimate a location of the transmit device, meaning that return signals can be directed only towards the estimated location, using only one or perhaps two modulated light sources that transmit light in that direction, thereby reducing the power requirement on the transmit side. This is particularly relevant in optical wireless communication systems where a receiving unit is co-located with corresponding a transmission unit.

Additionally, the selection unit 170 may use the estimated signal strength $RMS_B$ in order to make a decision of whether to switch to using segment B for LiFi communication or whether to continue using segment A, as described further below.

At S304, the selection unit 170 determines whether the (estimated) $RMS_B$ is greater than the previously-measured $RMS_A$.

If the estimated $RMS_B$ is greater than $RMS_A$, or optionally greater than $RMS_A$ by some non-zero threshold to avoid unnecessary frequent switching, then the evaluation process ends at S305, and the selection unit 170 controls the switch arrangement 130 to connect segment B, instead of segment A, to the output for the purpose of receiving LiFi signals.

If, on the other hand, the estimated $RMS_B$ is not greater than $RMS_A$, or optionally only greater than $RMS_A$ by less than some threshold, then the evaluation process ends at S306, and the signal switch 100 continues to use segment A for the receiving of LiFi signals.

In a third possibility, if the estimated $RMS_B$ is of the same order of magnitude as $RMS_A$, then the signal switch 100 may determine to use both segment A and segment B (i.e. to pass a combination of the signals from these segments). Here "same order of magnitude" can mean when the values are equal, or nearly equal, optionally with the additional requirement that both values be above a threshold. This is advantageous if both signals are almost equal in strength, or in other words when SNR of using them both together benefits with respect to using only one of the two. Similar considerations apply to more than two signals when they all receive the same amount of optical power, it can be even three or four segments.

The signal switch 100 and evaluation process described above provide a way to estimate the signal strength of each of the segments using a single signal strength detector 160 and also without needing to temporarily disconnect the currently-used segment. This process may be used repeatedly as part of a "probing phase" or "evaluation process" in order to estimate the signal strength of multiple segments.

Figure 4A:
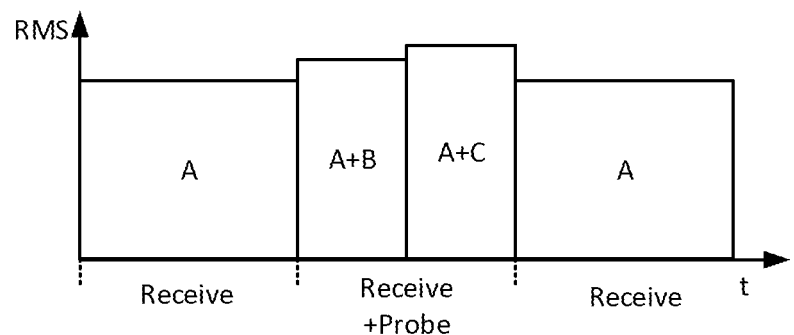
FIGS. 4a and 4b show schematically examples of probing phases.

FIG. 4a shows a graph of signal strength over time for a first example of a probing phase. In this example, the signal switch 100 is initially using segment A. A probing phase is shown in which the evaluation process described above is used to estimate a signal strength for both segment B and segment C.

In this example, the addition of segment B results in an increase to the measured signal strength which is smaller than the signal strength of segment A alone. Similarly, the addition of segment C results in a (different) increase in the measured signal strength which is also smaller than the signal strength of segment A alone. The increase in signal strength obtained by adding signals from another segment is used as an estimate of the signal strength for that segment alone. Hence, in this example, the selection unit 170 estimates both the signal strength for segment B and for segment C to be less than the signal strength for segment A. Therefore, the selection unit 170 determined in this case to continue using segment A for LiFi communication.

Figure 4B:
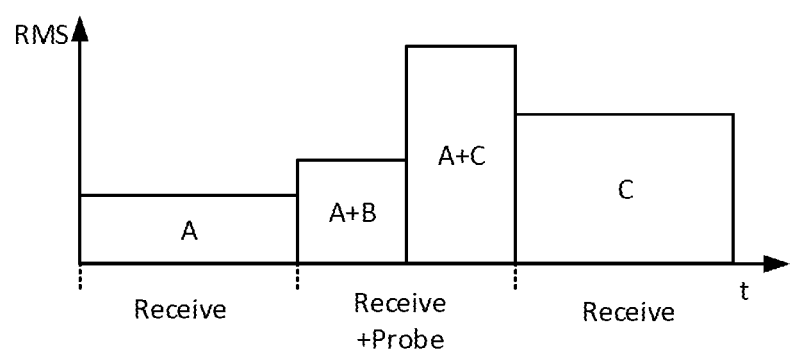

FIG. 4b shows a graph of signal strength over time for a second example of a probing phase which is similar to the first example. In this example, the addition of segment B again results in a small increase to the measured signal strength. However, the addition of segment C now results in an increase to the signal strength which is greater than the current signal strength for segment A on its own. The estimated signal strength for segment C is thereby determined to be higher than the signal strength of segment A, and therefore the selection unit 170 determines to switch to segment C, as shown in FIG. 4b.

In general, the selection unit 170 may estimate a signal strength for all the segments before making a decision as to whether to switch (to the segment with the highest estimated signal strength). Alternatively, the selection unit 170 may estimate a signal strength for each segment in turn and switch to using the first segment which is determined to have a higher signal strength than the current segment (without estimating signal strengths for any other segments).

The evaluation process described above may be performed at any time by the selection unit 170. The "need to take action" (to switch to the probing mode) can be determined in a variety of ways.

Figure 5A:
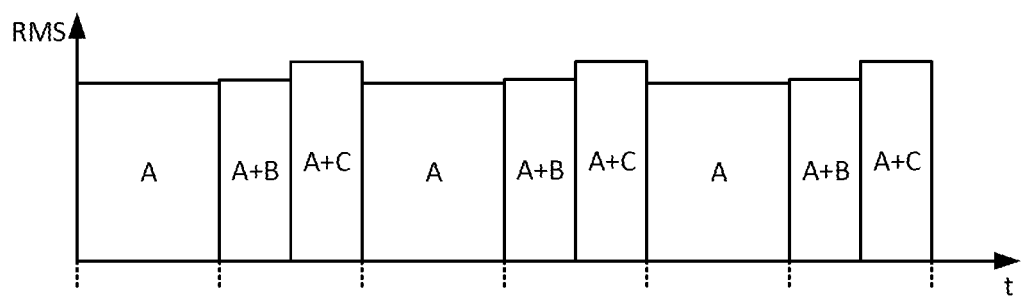
FIGS. 5a and 5b show schematically an example of a fixed scan pace.
Figure 5B:
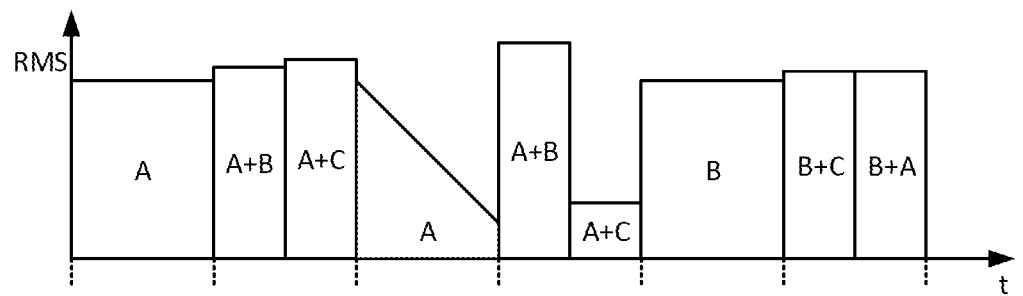

FIGS. 5a and 5b illustrate a "fixed scan pace" example in which the selection unit 170 is configured to perform the evaluation process according to a predetermined schedule. That is, the selection unit 170 may be configured to perform the evaluation process on a regular basis (e.g. multiple times per second). The evaluation process, whenever it is performed, may be implemented in accordance with any example described herein.

Some types of LiFi communication systems do not transmit continuously (e.g. they may employ some type of TDMA transmission). In such cases, the sampling time is preferably in accordance with these intermittent transmissions, preferably the period of testing a certain combination is at least one TDMA frame, or a period in which the system can assume that at least one transmission takes place. As the signal contains periods of activity and periods of silence, preferably the signal strength detector averages over a period that is long enough to converge to a stable value. In some examples this period may be, say, at least 10 or 100 times the sampling clock frequency of the PAM of OFDM signal, e.g. around a microsecond for an OFDM signal of 100 MHz. Preferably the period is short enough not to average over both active and idle periods (e.g. not to exceed a few milliseconds). To cope with the idle and active periods, the system preferably takes a maximum over all averaged rms values, maximized over a period that exceeds the duration of a TDMA frame.

Hence, in some examples, the selection unit 170 may only allow the addition of another segment(s) for testing during transmission (not reception). Typically there is a TX_ENABLE signal available in the LiFi system, which can be used by the selection unit 170 to make the determination of when to test. Alternatively or additionally, a drop in the signal strength measured by the signal strength detector 160 can be indicative of transmission and therefore can be used by the selection unit 170 to determine that there is no (out-going) communication in the channel.

In the example of FIG. 5a, the evaluation process comprises testing segment B and then segment C on a regular basis, but not switching because neither segment B nor segment C is determined to have a better signal strength than segment A. In the example of FIG. 5b, on the other hand, the signal strength for segment A decreases between performance of a first and second evaluation process. During the second evaluation process the signal strength for segment B is estimated to be higher than that of segment A and therefore the selection unit 170 determines to switch to segment B.

Figure 6:
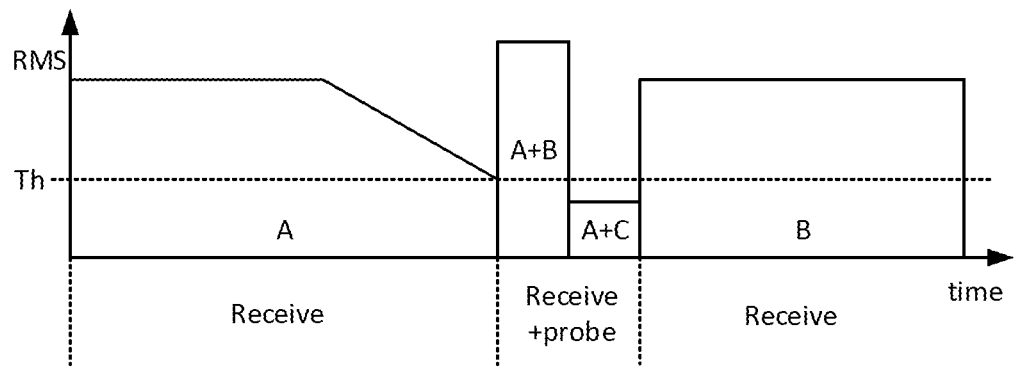
FIG. 6 shows schematically an example of a variable scan pace.

FIG. 6 illustrates a "variable scan pace" example in which the selection unit 170 is configured to perform the evaluation process in response to the signal strength of the currently-used segment falling below a threshold signal strength. As long as the signal strength of the currently-used segment is above the threshold signal strength, the selection unit 170 will not perform the evaluation process. When the signal strength falls below the threshold signal strength, the selection unit 170 begins the evaluation process. The evaluation process, once triggered, may be implemented in accordance with any example described herein. In the example shown in FIG. 5b, the evaluation process comprises testing segment B and then segment C, and determining to switch to segment B.

The threshold signal strength may be, for example, determined during some period of time minimal and maximal signal strength is measured. E.g. the threshold could be twice the minimal signal strength, or 6 dB difference, or threshold could be that mix-min<6 dB, or some other dB value, etc. When the gain of the additional signal(s) is altered, the threshold signal strength may be adjusted accordingly. For example, with G=1 it may be 3 dB, 6 dB, etc. This is discussed in more detail later below.

In further examples, the selection unit 170 may be configured to perform the evaluation process in response to the signal strength of the currently-used segment falling by more than a predetermined amount within a predetermined amount of time, that is, falling by a rate that exceeds some threshold rate.

In yet further examples, the selection unit 170 may be configured to perform the evaluation process in response to a new transmit device being connected.

The evaluation process may comprise testing more than one other segment in a sequence. It may also comprise testing more than one other segment simultaneously. Hence, there are various options for how the evaluation process may be implemented. Some examples are given below.

Figure 7:
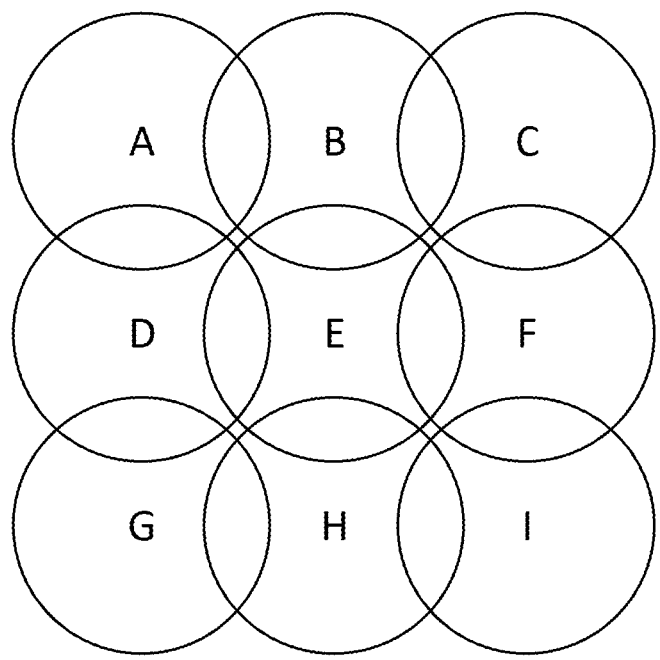
FIG. 7 shows schematically a representation of the fields of view of an example plurality of photodetectors.

Some of these examples make use of information regarding the overlap between the reception fields of view of the photodetectors 110. This difference in field of view generally translates into different coverage area for the photodetectors. Such information can be acquired, for example, during a commissioning phase, during a design stage, etc. For ease of explanation, it will be assumed that there are nine segments labelled A-I which have reception fields of view as illustrated schematically in FIG. 7, i.e. the nine reception fields of view are arranged in a square grid and each shares an overlap with adjacent reception fields of view (but not diagonally-adjacent fields of view), e.g. segment E has a field of view which overlaps with segments B, D, F and H. It is appreciated that similar methods may be employed for different numbers of segments having different arrangements of their respective fields of view.

In a first example, the evaluation process comprises testing each of the segments A-I in a predefined sequence (e.g. A, B, C, D, E, F, G, H, I, A, etc.).

In a second example, the evaluation process may comprise testing the segments in decreasing order of overlap with the current segment (i.e. beginning with the other segment having the greatest overlap with the currently-active segment). When there are multiple segments with the same amount of overlap, those segments may be tested in a predetermined order or a random order. For example, if the current segment is segment B, then segments A, E and C may be tested first, followed by segments D and F, etc. This has the advantage of increasing the chances of identifying a new segment with a better signal strength earlier, because the transmit device is more likely to have moved to a close reception field of view than to a far reception field of view.

In a third example, the evaluation process may comprise testing subsets of the segments to reduce the number of measurements required. E.g. the signal switch 100 may performing a binary search of the segments to determine the segment having the highest signal strength. This comprises testing a first half of the segments to determine a signal strength for the first half, and then testing a second half (the other half) of the segments to determine a signal strength for the second half. This process is then repeated within the half having the greatest combined signal strength until a single segment is determined.

A binary search can be performed to determine whether to switch from a current segment (e.g. segment E) to another segment (e.g. segment B) as shown in the example below.
First test: E+{A+B+C+D} and E+{F+G+H+I}; result E+{A+B+C+D} better
Second test: E+{A+B} and E+{C+D}; result E+{A+B} better
Third test: E+{A} and E+{B}; result E+{B} better
Answer: B Alternatively or additionally, a binary search can be performed when there is no current segment. That is, a binary search for may be performed as an initial step in order to determine a first segment to use, as shown in the example below.
First test: {A+B+C+D+E} and {F+G+H+I}; result {A+B+C+D+E} better
Second test: {A+B+C} and {D+E}; result {D+E} better
Third test: {D} and {E}; result {E} better
Answer: E Two or more of the various examples given above may be implemented in combination with one another. For example, the selection unit 170 may be configured to select an initial segment by performing a binary search to quickly find the best segment, and then may implement an evaluation process according to a predetermined schedule thereafter.

The selection unit 170 may additionally conduct the evaluation process, in addition to the predefined schedule, if the signal strength of the current segment drops below a threshold value. The order in which the segments are tested in the evaluation process may be different depending on how the evaluation process was triggered. For example, if the evaluation process was triggered by the signal strength threshold, then the segments may be tested in a random order, whereas a normal scheduled evaluation process may test the segments in an order defined by the overlap between the segments. If for example the evaluation process was triggered by the device turn on, then the segments may be tested in a binary search like method.

In some examples, the selection unit 170 may test the segments in an order based on historical patterns. To do so, the selection unit 170 may record (e.g. in a local memory) and analyse previous evaluation processes and their outcomes. The selection unit 170 may then determine a likelihood of switching to a particular second segment given the currently-used segment. For example, the selection unit 170 may identify that use of a first segment (e.g. segment B) is usually followed by a switch to a particular second segment (e.g. segment E). (This may occur because for example people carrying the transmit devices often move in a particular direction, for example along some corridor or within a room, such that the transmit devices frequently move from a field of view of segment B to a field of view of segment E). Likewise if there is a meeting room with a table having an AP mounted above; people will go left or right; not across. It is to be borne in mind that static furniture can dictate direction. In such cases, the selection unit 170 can modify the evaluation phase in order to test the second segment first.

Finally, the selection unit 170 may be configured to test all of the segments before making a decision as to which segment to switch to (i.e. the segment having the highest signal strength). Alternatively, the selection unit 170 may be configured to test the segments until a single segment is found which has a signal strength higher than the signal strength of the current segment, and to switch to that segment without testing the other segments (i.e. the end the evaluation process).

Whenever, and however, the testing is performed, the signal switch 100 may alter a power level of the one or more signals passed by the switch arrangement 130 during the testing. In such cases, a power level altering arrangement is also provided to which the selection unit 170 is operatively coupled in order to control the power level of each segment. For example, each segment may be associated with one or more amplifier stages (e.g. the TIA 120) which can be controlled by the selection unit 170. Alternatively or additionally, each segment may be associated with a respective attenuator (not shown) for reducing the power level of the signal from that segment before it is passed to the switch arrangement 130.

An advantage of this is the avoidance of clipping which may occur, for example, when there is overlap in the reception fields of view. For example, it may help to test by adding a signal at −12 dB of the amplitude (25%). If the new added one is stronger, it can still be detected, and if it is weaker it will not cause too much damage.

Consider, for example, a case in which a first signal is being passed by the signal switch 130 from segment A and a second segment B is tested using gain G. E.g. the selection unit 170 may control the TIA 120$b$ of the second segment B to apply a gain G to the signal as received by the second photodetector 110$b$ before being passed to the switch arrangement 130, and the selection unit 170 controls the switch arrangement 130 to pas both the first signal and the second signal (with gain G).

In this example, the combined signal power becomes equal to the power of the original signal plus G squared times the power of the added signal(s). If the new power exceeds the original power by a factor of $(1+G^2)$ or $(1+G)^2$, it is concluded that the newly added signal is stronger than the original signal. The choice to use power addition $(1+G^2)$ or coherent signal addition $(1+G)^2$ depends on whether one expects signals to come from different TXs (with phase difference) or from the same TX.

In particular advantageous examples, the gain G is selected to be as low as possible while still allowing the selection unit 170 to estimate the (unattenuated) signal strength of the tested segment using the signal strength detector 160. This minimises the disturbance to the receiver.

In general, the amplifiers (e.g. TIA 120, first stage amplifier 140, second stage 150 amplifier, as present) can be designed such that the combined signals as passed by the switch arrangement 130 do not get easily into clipping (e.g. by limiting their gain). This also has the advantage of preserving a wide bandwidth. As mentioned, the output signal (passed by the switch arrangement 130) is output to an external device such as a decoder or a modem. The external device may be provided with an AGC stage as an initial block, before further processing, to handle clipping at the external device.

Another advantage of adjusting gain or attenuation levels of the segments is that it allows for a smooth or "faded"/ "blended" transition between segments. It is possible that the decoding (by the external device), e.g. OFDM, may stop working if the switch between segments is abrupt. In other words, the switching (adding the additional segment(s)) can take place during transmission (the system may be, for example, a half-duplex system, so either transmission or reception take place). In this way, the whole packet can be received with a constant signal strength (assuming that the communication channel is further stable). This is beneficial for the receiver, since it is not exposed to sudden changes in signal strength, as mentioned. This could alternatively or additionally be addressed by using intermediate headers or pilot track changes, e.g. a IEEE WiFi-like system will be a bit more robust that that ITU cable based systems.

A faded transition is one in which the signal switch 100 does not transition from 100% (entirely) a first segment to 100% a second segment at a single point in time. Rather, the signal switch 100 may be configured to reduce (e.g. monotonically) the contribution from the first segment while increasing the contribution from the second segment in order to implement the transition over a transition period. This is advantageous as it helps to avoid losing parts of the data stream during the evaluation stage or when actually switching between segments.

As mentioned, in some examples there may be a respective gain control element for each segment. Hence, in some examples, the switch arrangement 130 may comprise the gain control elements and a summing point. That is, the switch arrangement 130 receives a signal from each segment, applies a (potentially different) respective gain to each signal, and then sums the signals before outputting the combined signal (e.g. to the first stage amplifier 140 as shown in FIG. 2).

In other words, the switching function may be implemented as a "summing amplifier" (the switch arrangement 130 described above) that adds incoming signals with an amplifier in front which has a stepwise controllable gain. This gain can be, in its simplest form, zero or unity (unity or some other non-zero constant). It can be advantageous to also introduce an intermediate gain, of say 0.25 (−12 dB). Such intermediate setting will allow a gentle inclusion of another photodiode signal, not to disturb the originally selected signal too much whenever a new signal is added. The use of a continuously voltage-controlled amplifier is preferred for performance reasons, though increases the component cost. A programmable "cut, attenuate, pass" can be implemented by digitally switching in a voltage divider that consists of two resistors. The incoming signal output is fed into the resistor, the other end of the resistor is connected to the summing amplifier input. This input can further be short-circuited to ground (e.g. gain 0), can be connected to ground with a resister of low value (attenuate), or can be left untouched, i.e., only used to feed to the summing amplifier at unity gain.

Figure 8:
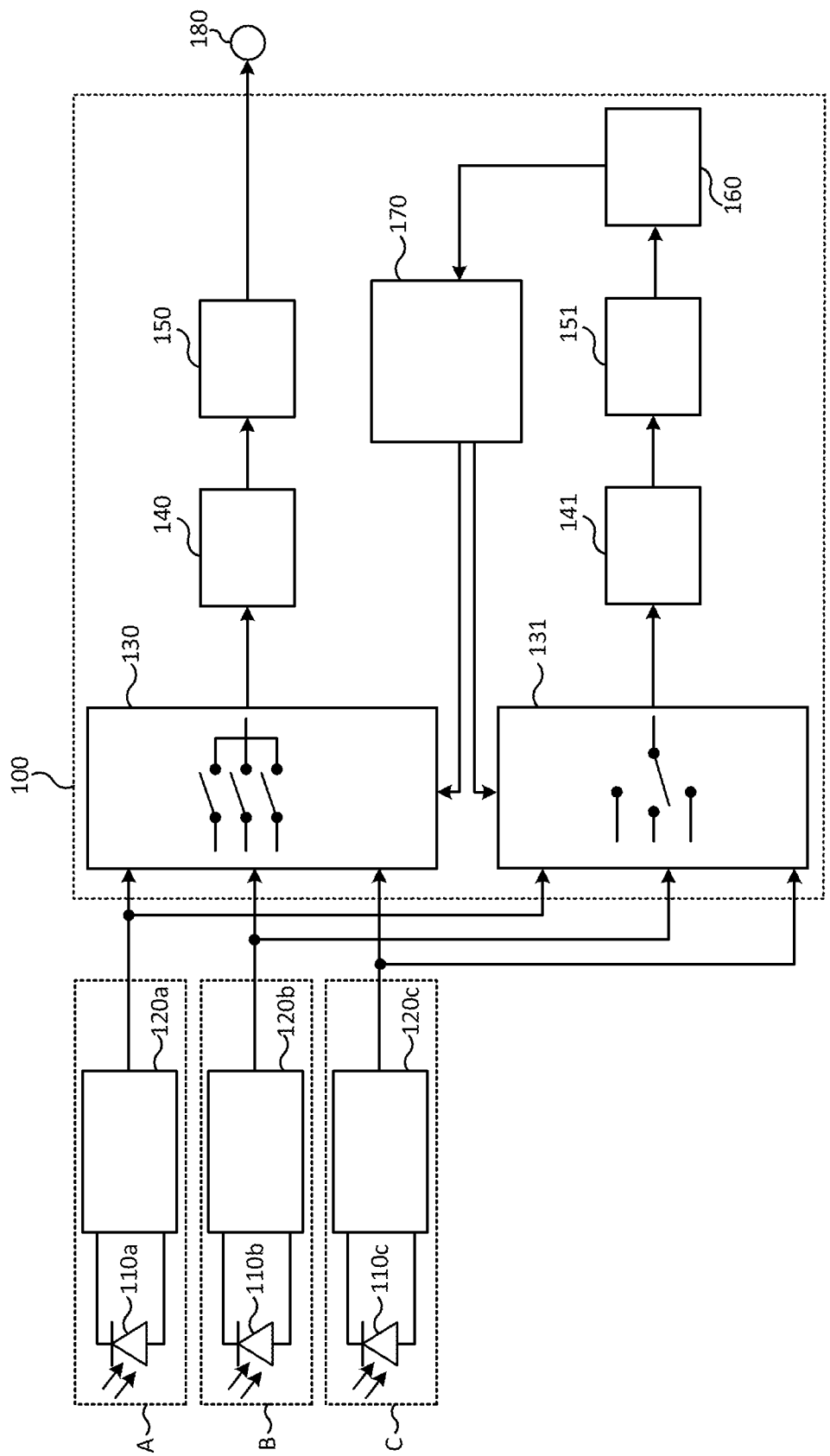
FIG. 8 shows schematically an alternative arrangement of the signal switch.

FIG. 8 shows schematically an alternative arrangement of the signal switch 100. The plurality of segments A-C, switch arrangement 130 ("first" switch arrangement in this example), first stage amplifier 140, second stage amplifier 150, and output 180 are arranged and operate as described earlier. In particular, the first switch arrangement 130 is also controlled by a selection unit 170 but in a different manner, as described below. Similar to the above, the two-stage amplifier is a design decision and is not essential.

In this example, a second switch arrangement 131 is also present. The selection unit 170 is also operatively coupled to the second switch arrangement 131 to control the second switch arrangement 131 (in addition to the first switch arrangement 130).

The second switch arrangement 131 is provided in parallel to the first switch arrangement 130. The second switch arrangement 131 also comprises a plurality of inputs which are operatively coupled to receive signals from a respective one of the segments A-C. However, unlike the first switch arrangement 130, the second switch arrangement 131 only passes a single signal at a time, for reasons that will become clear.

Whichever signal is currently being passed by the second switch arrangement 131 may optionally be amplified by one or more amplifiers in a corresponding manner to described above in relation to signals passed by the first switch arrangement 130. In FIG. 8, a first stage amplifier 141 and second stage amplifier 151 are shown for amplifying the signal passed by the second switch arrangement 131. This signal (optionally amplified, as discussed) is received by a signal strength detector 160 which, again, is substantially the same as discussed earlier. That is, the signal strength detector 160 is arranged to determine a signal strength (e.g. RMS value) of the signal passed by the second switch arrangement 131. The signal strength detector 160 is operatively coupled to provide the measured signal strength to the selection unit 170.

This arrangement, as shown in FIG. 8, therefore may be said to comprise a "main channel" (the branch containing the first switch arrangement 130) and a "secondary channel" (the branch containing the second switch arrangement 131).

The secondary channel can be used to determine the signal strength of one or more of the segments without affecting the signal on the main branch which his currently being passed to the output 180. For example, the selection unit 170 may "test" one of the segments by controlling the second switch arrangement 131 to selectively pass the signal from that segment. The signal strength as measured by the signal strength detector 160 will therefore correspond to the signal strength of that segment.

In an example, the selection unit 170 may control the second switch arrangement 131 to cycle through the segments (pass the signal from each of the segments in turn) to iteratively monitor the signal strength of each of the segments. This allows the selection unit 170 to examine which segments make a significant contribution to the signal strength and which segments just add noise. For instance, signal strength or correlation is used as an indicator of whether, after addition, the signal to noise ratio will be improved. Based on this, the selection unit 170 may control the first switch arrangement 130 to pass those segments determined to be making a significant beneficial contribution.

In an example, the selection unit 170 may control the first switch arrangement 130 to pass signals from all of the segments while an initial determination is made using the secondary channel.

Figure 9:
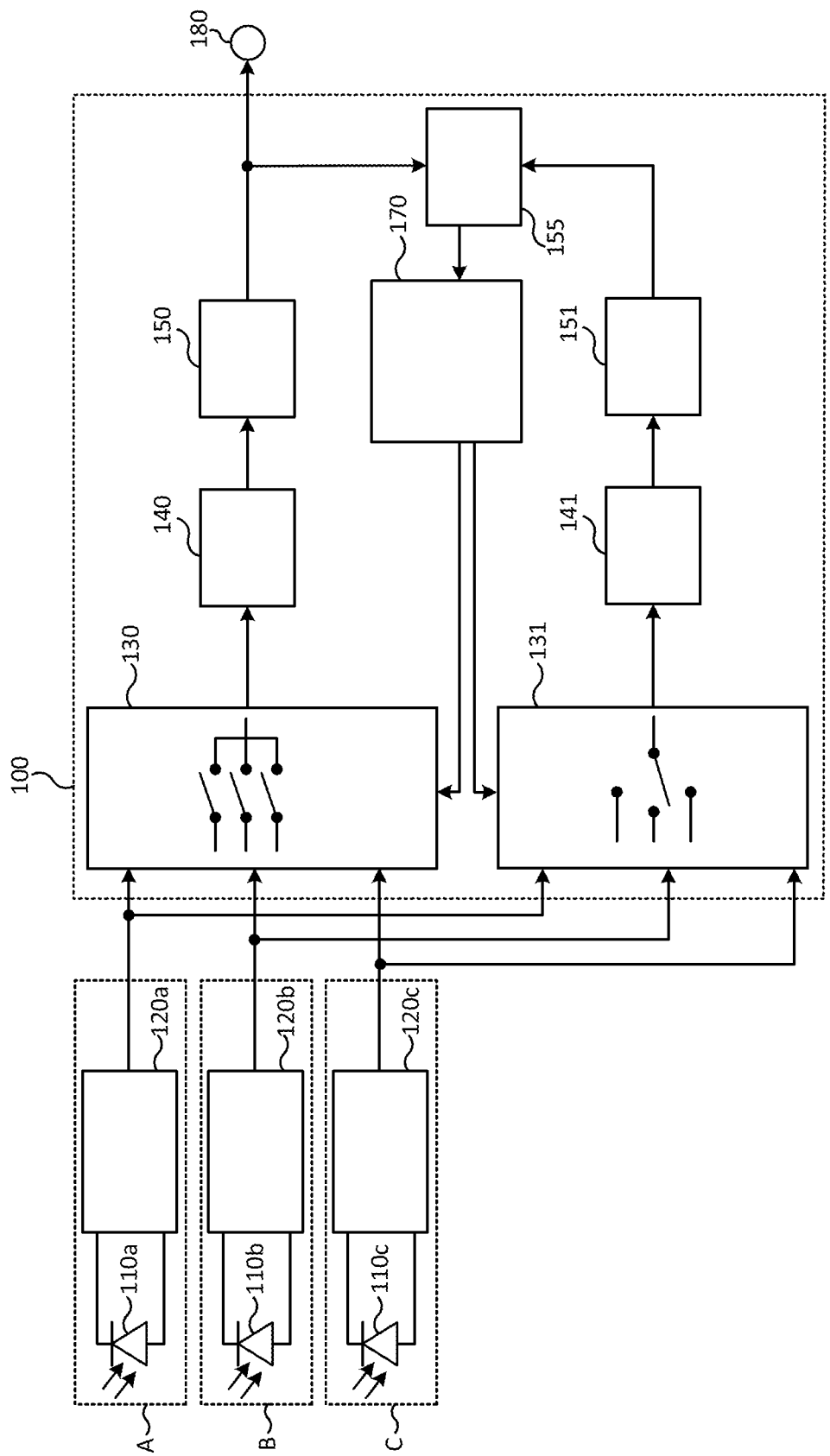
FIG. 9 shows an alternative arrangement wherein the signal strength detector is replaced by a correlator.

FIG. 9 shows another example in which the signal strength detector 150 is replaced by a correlator 155. The other elements are the same as described above in relation to FIG. 8.

The correlator 155 is operatively coupled to receive signals as passed by both the first switch arrangement 130 and the second switch arrangement 131 (each optionally amplified by one or more amplifiers). The selection unit 170 is operatively coupled to receive input from the correlator 155.

In operation, the correlator 155 determines the similarity of the signals passed by the first switch arrangement 130 and the second switch arrangement 131. In particular, when the first switch arrangement 130 is passing signals from more than one segment, the selection unit 170 may control the second switch arrangement 131 to selectively pass each of those signals in turn and identify which has the highest signal strength using input from the correlator 155. For example, while the first switch arrangement 130 is passing signals from all the segments (three segments A-C in this example), the signal at the output 180 comprises a contribution from each of the segments. The selection unit 170 can determine the relative contribution of a given segment by controlling the second switch arrangement 131 to pass the signal from that segment, because doing so will mean that the value determined by the correlator 155 is the degree of similarity (the correlation) between that one signal and the combination signal passed by the first switch arrangement 130. One advantage of using a correlator is that can distinguish between a strong signal and a strong interference. That is, a segment having a high signal strength, but which is substantially just noise, will not be identified by the correlator as a good candidate (despite the high signal strength).

In some examples, the signals from the segments may be filtered before being passed to the first switch arrangement 130, second switch arrangement 131, or both. This means that the signals as processed by the correlator 155 are pre-filtered. This has the advantage of limiting the noise floor prior to performing the signal strength detection. Frequencies below 10 MHz or so typically are stronger and include less noise. Therefore, in some examples, the signal(s) may be passed through a respective low-pass filter to remove frequencies above, say, 10 MHz. There may be other devices in the environment which are potential sources of interferences, e.g. remote controls operating. These types of devices typically operate below a cut-off frequency of around 1 MHz. Hence, in some examples, the signal(s) may be passed through a respective high-pass filter to remove frequencies below this limit (e.g. 1 MHz). Both types of filter may be realised using a band-pass filter.

One advantage of the arrangement of FIGS. 8 and 9 is that the selection unit 170 can continuously monitor the signal strengths of each segment and determine which one or more to use. This is particularly advantageous in a handover scenario in which the transmit device moves from the reception field of view of one segment to the reception field of view of another segment. An example of such a handover is described now with reference to FIG. 10. This may be performed using either of the arrangements given above in FIG. 8 or FIG. 9.

Figure 10:
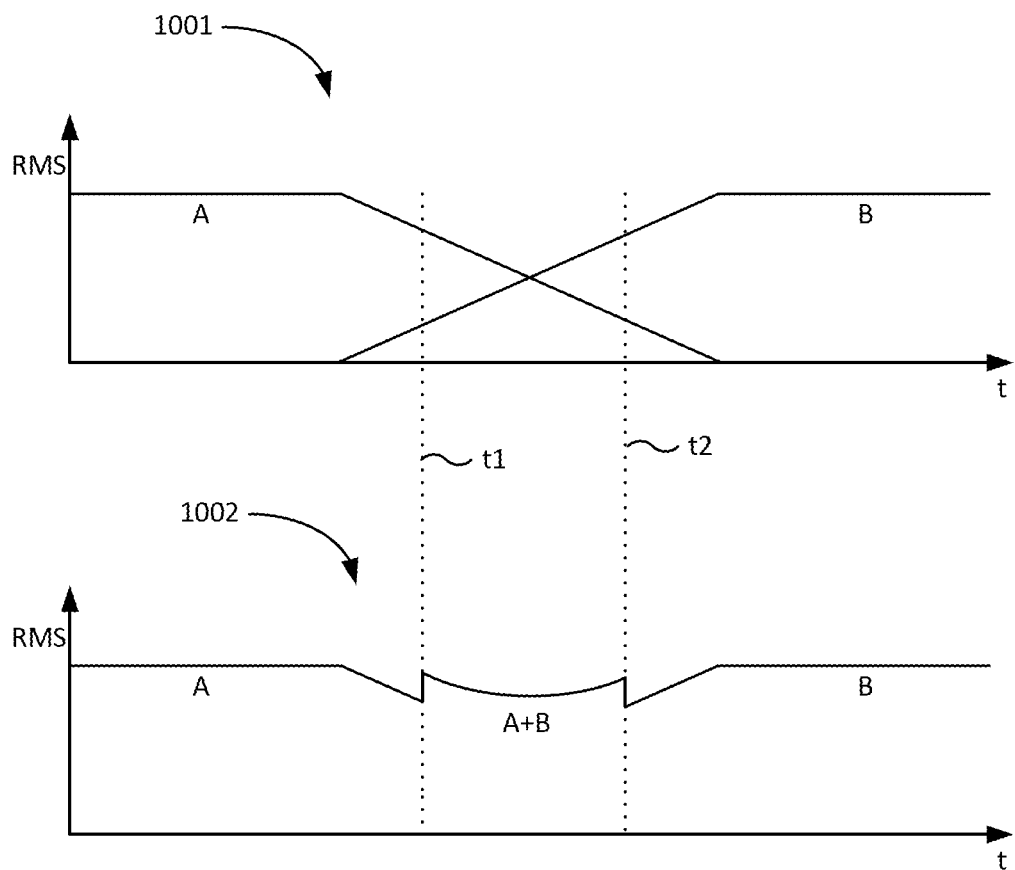
FIG. 10 shows graphs of signal strength over time for a number of segments.

In this example, the handover is between segment A and segment B. The upper graph 1001 is FIG. 10 shows the "actual" signal strength over time for each of the segments (note this is not actually measured). The signal strength for segment A is constant for a period of time, and then gradually falls off to zero. Around the time that the signal strength of segment A begins to decrease, the signal strength of segment B begins to rise from zero, and reaches a steady maximum value around the time that segment A reached a signal strength of zero.

The signal strength of the signal as passed by the first switch arrangement 130 is shown in the lower graph 1002.

Initially, the selection unit 107 is controlling the first switch arrangement 130 to only pass signals from segment A, but continues to monitor the signal strength of segment B. Once the signal strength for segment B reaches a threshold value, at time t1, the selection unit 170 determines that segment B is making a significant contribution and therefore controls the first switch arrangement 130 to additionally pass the signal from segment B.

The selection unit 170 continues to monitor the signal strength of both segment A and segment B. At a later point in time, t2, the selection unit 170 determines that segment A no longer makes a significant contribution (e.g. the signal strength for segment A has now fallen below the threshold value). Therefore, the selection unit 170 determines to remove segment A from the main channel, i.e. to control the first switch arrangement 130 to pass only signals from segment B.

It will be understood that the circuitry referred to herein may in practice be provided by a single chip or integrated circuit or plural chips or integrated circuits, optionally provided as a chipset, an application-specific integrated circuit (ASIC). Signal processing and evaluation may further make use of dedicated processors, ASICs, field-programmable gate array (FPGA), digital signal processor (DSP), graphics processing units (GPUs), or combinations thereof. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory (including for example a solid-state drive or SSD).

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A signal switch comprising:
  a switch arrangement for selectively passing optical wireless communication, OWC, signals received from a plurality of photodetectors for output on an output of the signal switch;
  a signal strength detector arranged to measure a signal strength of OWC signals as passed by the switch arrangement; and
  a selection unit for controlling the switch arrangement;
  wherein the selection unit is configured to estimate, while an OWC signal received from a first one of the photodetectors with a signal strength is being passed by the switch arrangement to said output of the signal switch, a signal strength of an OWC signal received from another one of the photodetectors, by performing an evaluation process in which the selection unit is configured to:
  control the switch arrangement to pass a combination of the OWC signal from the first photodetector and the OWC signal from the other photodetector;
  determine, using the signal strength detector, a signal strength of said combination of OWC signals; and
  estimate the signal strength of the OWC signal from the other photodetector based on the signal strength of the OWC signal from the first photodetector and the signal strength of said combination of OWC signals.

2. A signal switch according to claim 1, wherein the selection unit is configured to determine to switch from passing OWC signals received via the first photodetector to passing OWC signals received via the other photodetector if the estimated signal strength of the OWC signal from the other photodetector exceeds the signal strength of the OWC signal from the first photodetector by more than a selection threshold.

3. A signal switch according to claim 2, wherein the selection unit is configured to estimate a signal strength for OWC signals received via more than one other photodetector before determining to switch from passing OWC signals received via the first photodetector to passing OWC signals received via the photodetector having the highest estimated signal strength.

4. A signal switch according to claim 2, wherein the selection unit is configured to estimate a signal strength for OWC signals received via all of the photodetectors other than the first photodetector before determining to switch to passing OWC signals received from the first photodetector to passing OWC signals received via the photodetector having the highest estimated signal strength.

5. A signal switch according to claim 1, wherein the selection unit is configured to estimate the signal strength of the OWC signal from the other photodetector as the signal strength of the combination minus the signal strength of the OWC signal from the first photodetector.

6. A signal switch according to claim 1, wherein the selection unit is configured to estimate signal strengths for OWC signals received via the other photodetectors in a sequence based on respective fields of view for each photodetector.

7. A signal switch according to claim 1, wherein the selection unit is configured to determine an OWC signal received via one of the photodetectors as having the highest signal strength by performing a binary search of the photodetectors.

8. A signal switch according to claim 1, wherein the selection unit is configured to estimate signal strengths for the other photodetectors in a sequence based on historical patterns.

9. A signal switch according to claim 1, wherein the selection unit is configured to perform the evaluation process according to a predetermined schedule.

10. A signal switch according to claim 1, wherein the selection unit is configured to perform the evaluation process in response to the signal strength of the first OWC signal falling below a trigger threshold signal strength.

11. A signal switch according to claim 1, wherein the selection unit is configured to perform the evaluation process in response to the rate of fall of the signal strength of the first OWC signal being greater than a threshold rate.

12. A modem comprising the signal switch according to claim 1, the modem being configured to process the OWC signal output by the signal switch.

13. A system comprising the signal switch according to claim 1 and the plurality of photodetectors.

14. A method performed by a signal switch comprising a switch arrangement for selectively passing optical wireless communication, OWC, signals received via a plurality of photodetectors for output on an output of the signal switch, the method comprising:
    estimating, while a first OWC signal received from a first photodetector with a signal strength is being passed by the switch arrangement to said output of the signal switch, a signal strength of a second OWC signal received from a second photodetector by performing an evaluation process comprising:
    controlling the switch arrangement to pass a combination of the first OWC signal and the second OWC signal;
    determining a signal strength of said combination of OWC signals; and
    estimating the signal strength of the second OWC signal based on the signal strength of the first OWC signal and the signal strength of said combination of OWC signals.

15. A method according to claim 14, comprising determining to switch from passing OWC signals received via the first photodetector to passing OWC signals received via the other photodetector if the estimated signal strength of the OWC signal from the other photodetector exceeds the signal strength of the OWC signal from the first photodetector by more than a selection threshold.

* * * * *